United States Patent
Hawley

(10) Patent No.: US 10,710,574 B2
(45) Date of Patent: Jul. 14, 2020

(54) GRADEABILITY CONTROL IN A HYBRID VECHICLE

(71) Applicant: TOYOTA MOTOR ENGINEERING & MANUFACTURING NORTH AMERICA, INC., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/109,532

(22) Filed: Aug. 22, 2018

(65) Prior Publication Data
US 2020/0062238 A1 Feb. 27, 2020

(51) Int. Cl.
| | | |
|---|---|---|
| *B60W 20/19* | (2016.01) | |
| *B60K 6/547* | (2007.10) | |
| *B60W 10/08* | (2006.01) | |
| *B60W 10/11* | (2012.01) | |
| *B60K 6/485* | (2007.10) | |

(52) U.S. Cl.
CPC ............. *B60W 20/19* (2016.01); *B60K 6/485* (2013.01); *B60K 6/547* (2013.01); *B60W 10/08* (2013.01); *B60W 10/11* (2013.01); *B60W 2510/0657* (2013.01); *B60W 2510/083* (2013.01); *B60W 2510/244* (2013.01); *B60W 2552/15* (2020.02); *B60W 2710/083* (2013.01); *B60W 2710/1005* (2013.01); *B60Y 2200/92* (2013.01); *B60Y 2300/181* (2013.01)

(58) Field of Classification Search
CPC ...... B60W 20/19; B60W 10/11; B60W 10/08; B60W 2510/0657; B60W 2510/244; B60W 2550/142; B60W 2710/1005; B60W 2710/083; B60W 2510/083; B60W 2552/15; B60K 6/485; B60K 6/547; B60Y 2300/181; B60Y 2200/92
USPC .......................................................... 701/1
See application file for complete search history.

(56) References Cited

U.S. PATENT DOCUMENTS

| | | |
|---|---|---|
| 6,827,167 B2 | 12/2004 | Cikanek |
| 7,335,124 B2 | 2/2008 | Yatabe |
| 7,673,714 B2 | 3/2010 | Soliman |
| 8,808,141 B2 | 8/2014 | Shelton |
| 9,475,483 B2 | 10/2016 | Johri |
| 2009/0115349 A1 | 5/2009 | Heap |

(Continued)

*Primary Examiner* — Brian P Sweeney
(74) *Attorney, Agent, or Firm* — Sheppard, Mullin, Richter & Hampton LLP; Hector A. Agdeppa; Daniel N. Yannuzzi

(57) ABSTRACT

Systems and methods for improving gradeability of a hybrid electric vehicle are described. More particularly, an electric motor of the hybrid electric vehicle may be used to augment engine torque generated by an internal combustion engine of the hybrid electric vehicle with motor torque generated by the electric motor during periods when a desired acceleration of the hybrid electric vehicle demands a target driveforce that exceeds a maximum driveforce generated by the internal combustion engine at a particular gear ratio of the transmission of the hybrid electric vehicle. Augmenting the engine torque with the motor torque during such periods of acceleration may delay a downshift of the transmission to a lower gear ratio thereby improving a driver experience.

18 Claims, 9 Drawing Sheets

(56) References Cited

U.S. PATENT DOCUMENTS

| | | | |
|---|---|---|---|
| 2011/0087392 A1* | 4/2011 | Kshatriya | B60K 6/485 |
| | | | 701/22 |
| 2015/0183418 A1* | 7/2015 | Shin et al. | B60K 6/442 |
| | | | 701/22 |
| 2016/0023650 A1* | 1/2016 | Jiang et al. | B60W 20/15 |
| | | | 701/22 |
| 2016/0200315 A1* | 7/2016 | Fracchia | B60K 6/448 |
| | | | 701/22 |
| 2016/0244049 A1* | 8/2016 | Petridis | B60W 10/06 |

* cited by examiner

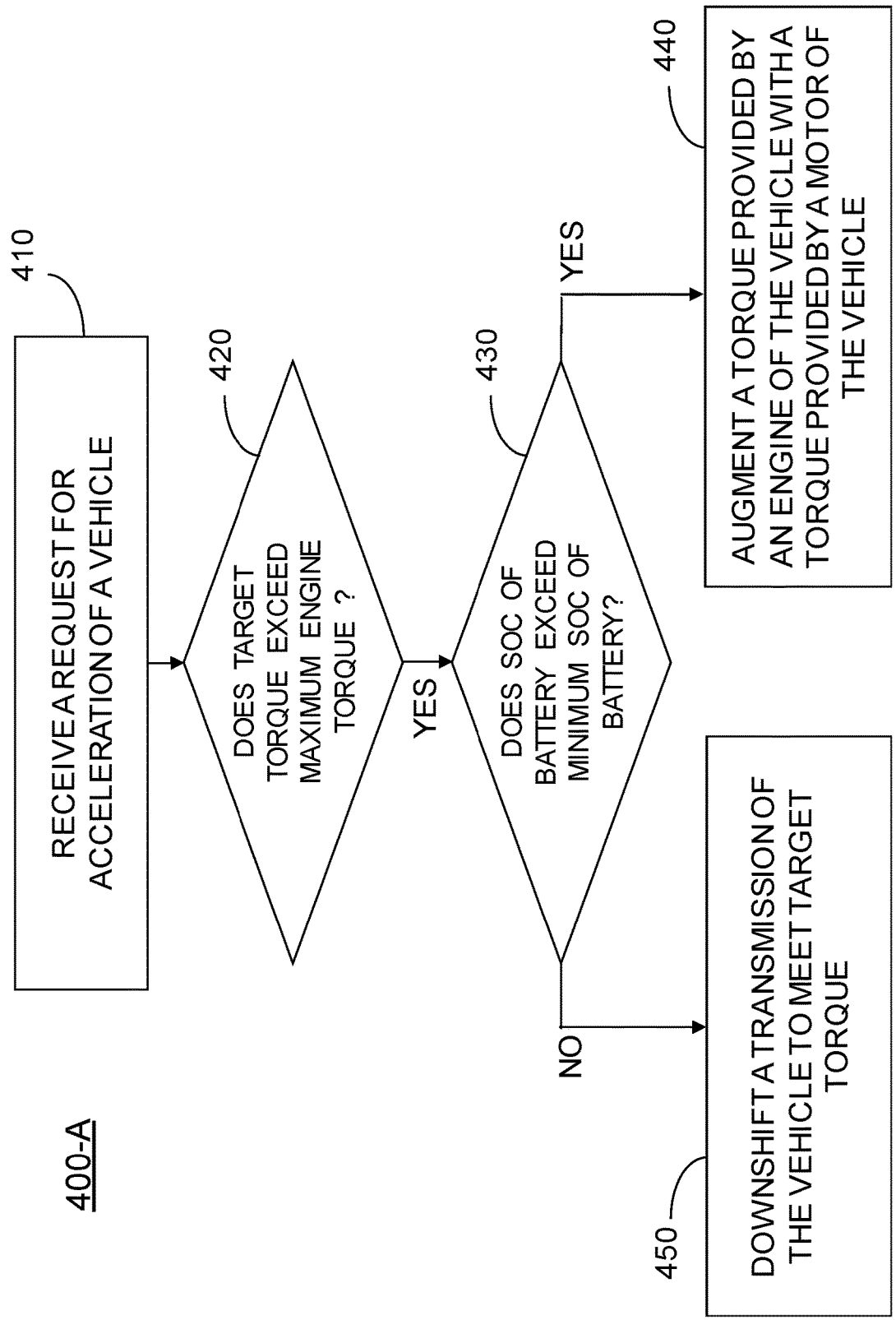

GRADEABILITY CONTROL IN A HYBRID VECHICLE

TECHNICAL FIELD

The present disclosure relates generally to controlling gradeability in a hybrid vehicle. In some embodiments, engine torque generated by an engine of the hybrid vehicle may be augmented by motor torque generated by an electric motor of the hybrid vehicle during periods of acceleration without immediately resorting to downshifting.

DESCRIPTION OF RELATED ART

Hybrid vehicles have become increasingly popular among consumers concerned with their environmental impact and with increasing fuel economy. Hybrid vehicles generally utilize an engine, e.g., an internal combustion engine, along with an electric motor, which may also operate as a generator to provide energy to a battery that powers the electric motor. Hybrid vehicles may use an engine clutch that connects/disconnects the engine to/from a drivetrain. The drivetrain may include the engine and the electric motor, and a transmission coupled to the electric motor for transmitting power from the engine, the electric motor, or both.

In a conventional vehicle, when a call for acceleration is received, engine torque is initially increased until a maximum engine torque is achieved. If the call for acceleration requires additional engine torque in excess of the maximum engine torque, the transmission may be downshifted to a lower gear in order to supply additional drive power. However, downshifting may negatively impact a driver experience or "driveability" of the vehicle.

BRIEF SUMMARY OF THE DISCLOSURE

Various aspects of the disclosure describe improving gradeability of a hybrid electric vehicle. More particularly, an electric motor of the hybrid electric vehicle may be used to augment engine torque generated by an internal combustion engine of the hybrid electric vehicle with motor torque generated by the electric motor during periods when a desired acceleration of the hybrid electric vehicle demands a target driveforce that exceeds a maximum driveforce generated by the internal combustion engine at a particular gear ratio of the transmission of the hybrid electric vehicle. Augmenting the engine torque with the motor torque during such periods of acceleration may delay a downshift of the transmission to a lower gear ratio thereby improving a driver experience (i.e., gradeability).

In some embodiments, a method comprises: receiving a request for acceleration of a vehicle; determining whether the request for acceleration requires a target torque generated from an engine of the vehicle to exceed a maximum engine torque of the engine; when the target torque exceeds the maximum engine torque: determining whether a motor of the vehicle is available to augment the torque generated by the engine with a torque generated by the motor, when the motor of the vehicle is available to augment the torque generated by the engine, augmenting the torque generated by the engine of the vehicle with the torque generated by the motor of the vehicle to meet the target torque, and when the motor of the vehicle is unavailable to augment the torque generated by the engine, downshifting a transmission of the vehicle to meet the target torque.

In some embodiments, determining whether a motor of the vehicle is available to augment the torque generated by the engine with a torque generated by the motor comprises determining whether a state of charge of a battery providing current to the motor of the vehicle exceeds a minimum state of charge for the battery.

In some embodiments, determining a state of charge of a battery providing current to a motor of the vehicle comprises determining an amount of current being provided by the battery to the motor.

In some embodiments, determining a state of charge of a battery providing current to a motor of the vehicle comprises integrating, over time, an amount of current being provided by the battery to the motor.

In some embodiments, determining whether a motor of the vehicle is available to augment the torque generated by the engine with a torque generated by the motor comprises determining whether a motor use timer exceeds a maximum motor use time.

In some embodiments, determining whether a motor of the vehicle is available to augment the torque generated by the engine with a torque generated by the motor comprises determining whether a battery recharge timer exceeds a minimum battery recharge time.

Some embodiments further comprise determining whether the request for acceleration is due to an increase in road grade; and when the request for acceleration is due to the increase in road grade, downshifting the transmission of the vehicle to meet the target torque In some embodiments, determining whether the request for acceleration is due to an increase in road grade comprises determining whether the road grade is less than a road grade threshold.

Some embodiments further comprise delaying a downshift of the transmission of the vehicle thereby improving a driver experience when the motor of the vehicle is available to augment the torque generated by the engine.

In some embodiments, a hybrid electric vehicle comprises: an internal combustion engine; an electric motor operatively connected in parallel to the internal combustion engine; and an electronic control unit configured to control operation of the electric motor to augment engine torque generated by the internal combustion engine with motor torque generated by the electric motor, wherein the electronic control unit is configured to: receive a request for acceleration of the hybrid electric vehicle; determine whether the request for acceleration requires a target torque generated from the internal combustion engine of the vehicle to exceed a maximum engine torque of the internal combustion engine; when the target torque exceeds the maximum engine torque: determining whether the electric motor of the hybrid electric vehicle is available to augment the torque generated by the internal combustion engine with a torque generated by the electric motor, when the electric motor of the hybrid electric vehicle is available to augment the torque generated by the internal combustion engine, augmenting the torque generated by the internal combustion engine of the hybrid electric vehicle with the torque generated by the electric motor of the hybrid electric vehicle to meet the target torque, and when the electric motor of the hybrid electric vehicle is unavailable to augment the torque generated by the internal combustion engine, downshifting a transmission of the hybrid electric vehicle to meet the target torque.

In some embodiments, the electronic control unit is further configured to determine whether a state of charge of a battery providing current to the electric motor of the hybrid electric vehicle exceeds a minimum state of charge for the battery.

In some embodiments, the electronic control unit is further configured to determine an amount of current being provided by the battery to the electric motor.

In some embodiments, the electronic control unit is further configured to integrate, over time, an amount of current being provided by the battery to the electric motor.

In some embodiments, the electronic control unit is further configured to determine whether a motor use timer exceeds a maximum motor use time.

In some embodiments, the electronic control unit is further configured to determine whether a battery recharge timer exceeds a minimum battery recharge time.

In some embodiments, the electronic control unit is further configured to determine whether the request for acceleration is due to an increase in road grade; and when the request for acceleration is due to the increase in road grade, downshift the transmission of the hybrid electric vehicle to meet the target torque In some embodiments, determining whether the request for acceleration is due to an increase in road grade comprises determining whether the road grade is less than a road grade threshold.

In some aspects, when the electric vehicle motor of the hybrid electric vehicle is available to augment the torque generated by the internal combustion engine, a downshift of the transmission of the hybrid electric vehicle is delayed, thereby improving driver experience.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4A is a flow chart illustrating an example operation for controlling gradeability in accordance with various embodiments of the present disclosure.

The figures are not exhaustive and do not limit the present disclosure to the precise form disclosed.

DETAILED DESCRIPTION

Various embodiments of the present disclosure are directed to controlling gradeability of a hybrid vehicle, e.g., a parallel hybrid vehicle, thereby improving driveability experienced by a driver of the hybrid vehicle. Parallel hybrid vehicles may utilize an engine, an electric motor (referred to herein as simply a motor), or both to provide drive power, where the motor and engine may be joined in parallel. In order to improve "in-gear" gradeability of the hybrid vehicle, particularly during transient driving conditions, torque provided by the engine of the hybrid vehicle (i.e., engine torque) may be augmented with torque provided by the motor of the hybrid vehicle (i.e., motor torque) before downshifting.

For example, when a call for acceleration is received by an engine control unit, the engine torque provided by the engine is increased until either the engine reaches a desired or "target" engine torque or the engine reaches a maximum engine torque. In a conventional hybrid vehicle, when engine torque reaches the maximum engine torque, the engine control unit requires a transmission of such conventional hybrid vehicle to downshift to a lower gear in order to provide the target drive power. According to various embodiments of the present disclosure, when engine torque exceeds the maximum engine torque, the engine torque provided by the engine is augmented with motor torque provided by the motor of the hybrid vehicle to meet the target drive power, thereby delaying any downshift of the transmission and improving driving experience.

Use of the motor of the hybrid vehicle impacts a state of charge (SOC) of a battery (or batteries) of the hybrid vehicle by depleting energy stored by the battery of the hybrid vehicle. Thus, engine torque may be augmented with motor torque for only as long as the battery can supply the required energy, after which time the vehicle must operate in an "engine-only" mode until the batteries can be recharged, as would be appreciated. According to various embodiments, the state of charge of the batteries may be determined to determine if, and in some embodiments, for how long, motor torque may augment engine torque.

Figure 1A:
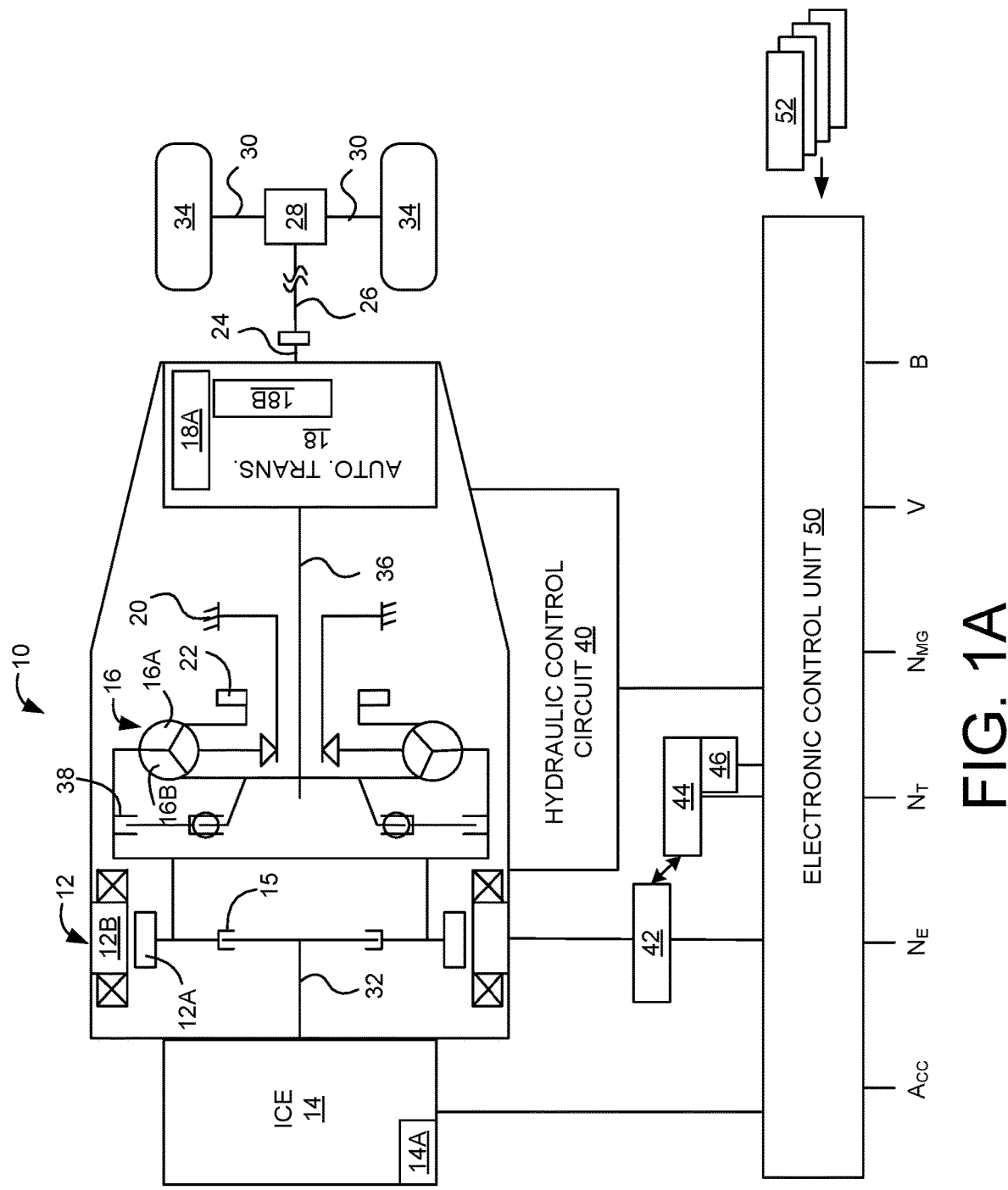
FIG. 1A is a schematic representation of a hybrid vehicle in which gradeability control may be implemented in accordance with various embodiments of the present disclosure.

FIG. 1A is a schematic representation of an example hybrid vehicle 10 in which gradeability control may be implemented in accordance with various embodiments. For clarity of illustration, not all elements of hybrid vehicle 10 are labeled with a reference numeral. For example, in some instances, only one of two or more elements or components of hybrid vehicle 10 are labeled with a reference numeral. However, it may be assumed that the functionality and/or operation of similarly-illustrated elements or components are the same or substantially similar, unless described otherwise. Moreover, aspects of hybrid vehicle 10 may be described from the perspective of one/one set of elements or components. It may be assumed that secondary instances of those elements or components may operate the same or in a similar manner. It should also be noted that for ease of description and clarity of figures, not all components of a hybrid vehicle have been illustrated, and that the figures and corresponding descriptions are not meant to be limiting. It should be further noted that a hybrid vehicle may embody certain variations with respect to its elements or components, which are contemplated herein. For example hybrid vehicle 10 may be configured with only a single motor.

FIG. 1A includes an example drive system of a hybrid vehicle 10 that may include an engine 14 and a motor 12 as drive sources. Driving force generated by the engine 14 and the motor 12 may be transmitted to a pair of wheels 34 via a torque converter 16, an automatic transmission 18, a differential gear device 28, and a pair of axles 30. Each of the motor 12, the torque converter 16, and the automatic transmission 18 may be housed in a transmission case 20. The transmission case 20 may be a splittable case made of aluminum die cast parts, for example, and fixed to a non-rotating member such as a vehicle body.

Hybrid vehicle 10 may be driven/powered with either the engine 14 or the motor 12, or both, as the drive source for travel. In other words, any one of a plurality of travel modes may be selectively established in the hybrid vehicle 10. A first travel mode may be an engine-only travel mode that only uses the engine 14 as the drive source for travel. A second travel mode may be an EV travel mode that only uses the motor 12 as the drive source for travel. A third travel mode may be an HEV hybrid travel mode that uses the engine 14 and the motor 12 as drive sources for travel. In the engine-only and HEV travel modes, hybrid vehicle 10 travels by using the driving force generated at least by engine 14 while a clutch 15 is engaged. In EV travel mode, hybrid vehicle 10 travels by using the driving force generated by motor 12 while the engine 14 is stopped and clutch 15 is disengaged.

Engine 14 may be an internal combustion engine such as a gasoline engine or a diesel engine of an in-cylinder injection type, where fuel is injected directly into a combustion chamber. An output control device 14A is provided to control drive (output torque) of the engine 14. The output control device 14A includes a throttle actuator that controls opening and closing of an electronic throttle valve, a fuel injection device that controls fuel injection, an ignition device that controls ignition timing, and the like. The output control device 14A executes output control of engine 14 according to a command control signal(s) supplied from an electronic control unit 50 described below. Such output control may include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A lock-up clutch 38 that directly connects a pump impeller 16A and a turbine wheel 16B so that they may integrally rotate is provided between pump impeller 16A and the turbine wheel 16B of torque converter 16. The lock-up clutch 38 may be controlled such that its engagement state becomes any one of engagement (complete engagement), slip engagement, and disengagement (complete disengagement) according to hydraulic pressure supplied from a hydraulic control circuit 40. A mechanical hydraulic pump 22 is coupled to the pump impeller 16A of the torque converter 16, and hydraulic pressure generated by hydraulic pump 20 is supplied to hydraulic control circuit 40 as source pressure along with rotation of the pump impeller 16A. Turbine wheel 16B may be coupled to a transmission input shaft 36 that transfers power from motor 12 and/or engine 14 to automatic transmission 18 to which a transmission output shaft 24 is attached. Connected to transmission output shaft 24 is a propeller shaft 26 coupled to differential gear device 28.

Automatic transmission 18 may be a stepped transmission mechanism that selectively establishes any of a plurality of predetermined gears (gear ratios), for example, and is configured to include a plurality of engagement elements to perform such gear ratio changes. Automatic transmission 18 may include a plurality of hydraulic frictional engagement devices, such as multiple disc clutches 18B and brakes 18A whose engagement is controlled by a hydraulic actuator. These hydraulic frictional engagement devices are selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) may be selectively established according to a combination of coupling states of the hydraulic frictional engagement devices. For example, the coupling states of the hydraulic frictional engagement devices may allow for upshifting and downshifting between the forward and reverse gears.

Motor 12 may include a rotor 12A and a stator 12B. Rotor 12A may be rotatably supported around an axis by the transmission case 20. Stator 12B may be integrally fixed to the transmission case 20 on an outer peripheral side of the rotor 12A. Motor 12 may be a motor generator that functions as a motor that generates driving force and a generator that generates reaction force. The motor 12 may be connected to a power storage device, such as a battery 44 and a capacitor via an inverter 42. The electronic control unit 50 described below controls inverter 42, adjusts driving current supplied to or received from coils of the motor 12, and controls driving of the motor 12. That is, output torque of the motor 12 may be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to the rotor 12A of the motor 12 via clutch 15. Rotor 12A of the motor 12 is coupled to a front cover that is an input member of the torque converter 16. Clutch 15 may be, for example, a multiple disc type hydraulic frictional engagement device whose engagement is controlled by a hydraulic actuator. Clutch 15 may be controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 may be controlled according to the hydraulic pressure supplied from the hydraulic control circuit 40. When clutch 15 is engaged, power transmission may be provided in the power transmission path between the crankshaft 32 and the front cover of the torque converter 16. On the other hand, when clutch 15 is disengaged, power transmission may be blocked from being delivered to the power transmission path between the crankshaft 32 and the front cover of the torque converter 16. In a slip engagement state or mode, clutch 15 may be engaged, and power transmission according to a torque capacity (transmission torque) of the clutch 15 may be provided to the power transmission path between the crankshaft 32 and the front cover of the torque converter 16.

Hybrid vehicle 10 may include an electronic control unit 50. Electronic control unit 50 may include a microcomputer that includes a CPU, a RAM, a ROM, an input-output interface, and the like. In electronic control unit 50, the CPU may utilize a temporary storage function of the RAM to perform signal processing according to a program in advance stored in the ROM. Accordingly, the electronic control unit 50 may execute various kinds of control such as drive control of the engine 14, drive control of the motor 12, speed change control of the automatic transmission 18, engagement force control of the clutch 15, engagement control of the lock-up clutch 38, and the like. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the hybrid vehicle 10.

As illustrated in FIG. 1A, the electronic control unit 50 is supplied with various kinds of input signals detected by each sensor provided in the hybrid vehicle 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and power storage amount (remaining capacity, charged amount), e.g., battery SOC of battery 44. It should be noted that more signals indicative of other operational aspects of hybrid vehicle 10 may be received by electronic control unit 50, e.g., a temperature of motor 12, coolant temperature of hybrid vehicle 10, intake air amount of engine 14, etc.

Electronic control unit 50 may receive the input signals from various sensors 52 configured to sense relevant operational characteristics of hybrid vehicle 10. For example, accelerator operation amount $A_{CC}$ may be detected by an accelerator operation amount sensor that determines the degree to which an accelerator pedal is depressed/actuated. For example, brake operation amount B may be detected by a foot brake sensor. For example, engine revolution speed $N_E$ may be detected by an engine revolution speed sensor. The turbine rotational speed $N_T$ may be detected by a turbine rotational speed sensor. The motor rotational speed $N_{MG}$ may be detected by a motor rotational speed sensor. Vehicle speed V may be detected by a vehicle speed sensor. Battery SOC may be detected by an SOC sensor 46. Another example of a sensor 52 may be a positioning or location sensor, such as a Global Positioning System (GPS) receiver that may provide location information corresponding to a location of hybrid vehicle 10.

Additionally, electronic control unit 50 may receive input signals from a network interface device 48. Network interface device 48 may receive information such as map data, road conditions information (e.g., upcoming road slope/grade information, upcoming turn information), traffic information, and the like from one or more information service providers. Instead of relying solely on a GPS receiver, a location of hybrid vehicle 10 may be determined from information received by network interface device 48.

Electronic control unit 50 may supply various output signals to one or more devices/components/elements provided in hybrid vehicle 10. For example, the electronic control unit 50 may supply signals to output control device 14A of the engine 14 to effectuate drive control of the engine 14. Electronic control unit 50 may supply signals to inverter 42 for effectuating drive control of the motor 12. Electronic control unit 50 may supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15. Electronic control unit 50 may also supply signals to the linear solenoid valve in the hydraulic control circuit 40 for engagement control of the lock-up clutch 38, line pressure control, and the like.

Figure 1B:
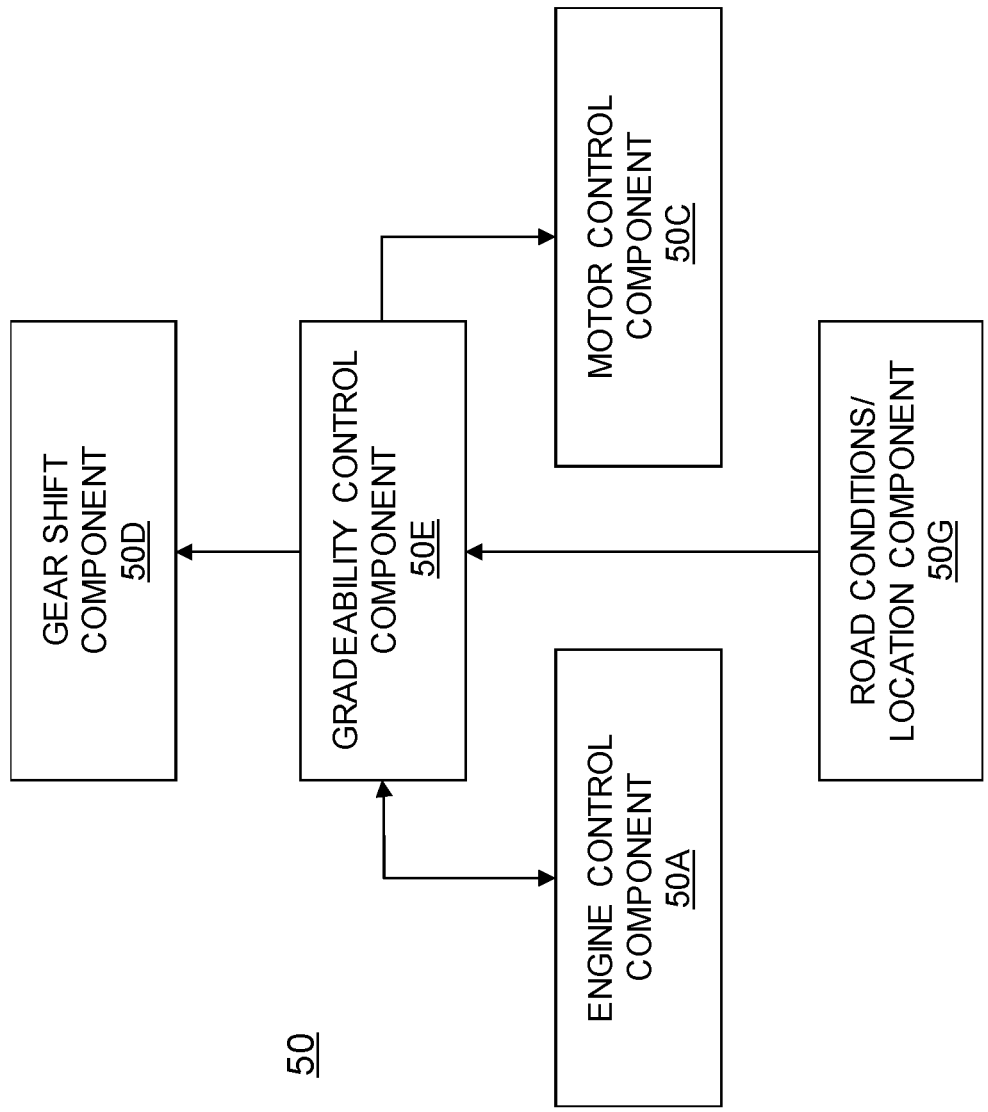
FIG. 1B is a functional block diagram illustrating component parts of a control function included in an electronic control unit of the hybrid vehicle illustrated in FIG. 1A.

FIG. 1B is a functional block diagram that illustrates example parts of a control function included in the electronic control unit 50. An engine control component 50A illustrated in FIG. 1B controls the drive (output torque or engine torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required from engine 14 may be achieved. To control engine 14, clutch 15 may be engaged (slip or complete engagement) so as to connect engine 14 to the power transmission path. Engine control component 50A may instruct engine 14 to rotate resulting in an engine revolution speed $N_E$, and the supply of fuel to engine 14 is started via the output control device 14A.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing out of battery 44 so as to generate motor torque such that hybrid vehicle 10 accelerates. In some embodiments, motor control component 50C receives control signal(s) from a gradeability control component 50E to augment engine torque from engine 14 with motor torque from motor 12 as described below.

A gear shift component 50D may output a control signal(s) instructing engagement/disengagement of one or more hydraulic frictional engagement devices through hydraulic control circuit 40 to effectuate a downshift to a lower gear ratio from a current gear ratio. In some embodiments, gear shift component 50D receives control signal(s) from gradeability control component 50E to downshift as described below.

Gradeability control component 50E may make determinations regarding augmenting engine torque with motor torque to improve driveability on the basis of a target driving force or target torque as described below. A determination may be made whether to augment engine torque with motor torque on the basis of, e.g., vehicle speed V, accelerator operation amount $A_{CC}$, state of charge of battery 44, road conditions, etc. In some embodiments, gradeability control component 50C may determine (by measuring, calculating, sensing, or otherwise) the state of charge of battery 44 to determine, for example, whether, or for how long, motor 12 may provide motor torque to augment the engine torque provided by engine 14. For example, if the battery SOC of battery 44 indicates a low state of charge, gradeability control component 50E may determine to whether to augment engine torque with motor torque or to request that gear shift component 50D initiate a downshift to meet the target torque.

A road conditions/location component 50G may make determinations regarding a location of hybrid vehicle 10, as well as road conditions, e.g., upcoming road conditions. In one embodiment, road conditions/location component 50G may embody a navigation unit commonly found in many modern vehicles, hybrid or otherwise. Road conditions/ location component 50G may receive information regarding road conditions from network interface device 48 and/or a GPS receiver, which may be one embodiment of a sensor 52. For example, the location of hybrid vehicle at any point during its travel may be determined, e.g., by the GPS receiver, and this location may be correlated with road conditions information relevant to that location. In some embodiments, road conditions may include a grade of the road on which the vehicle is travelling.

Figure 2:
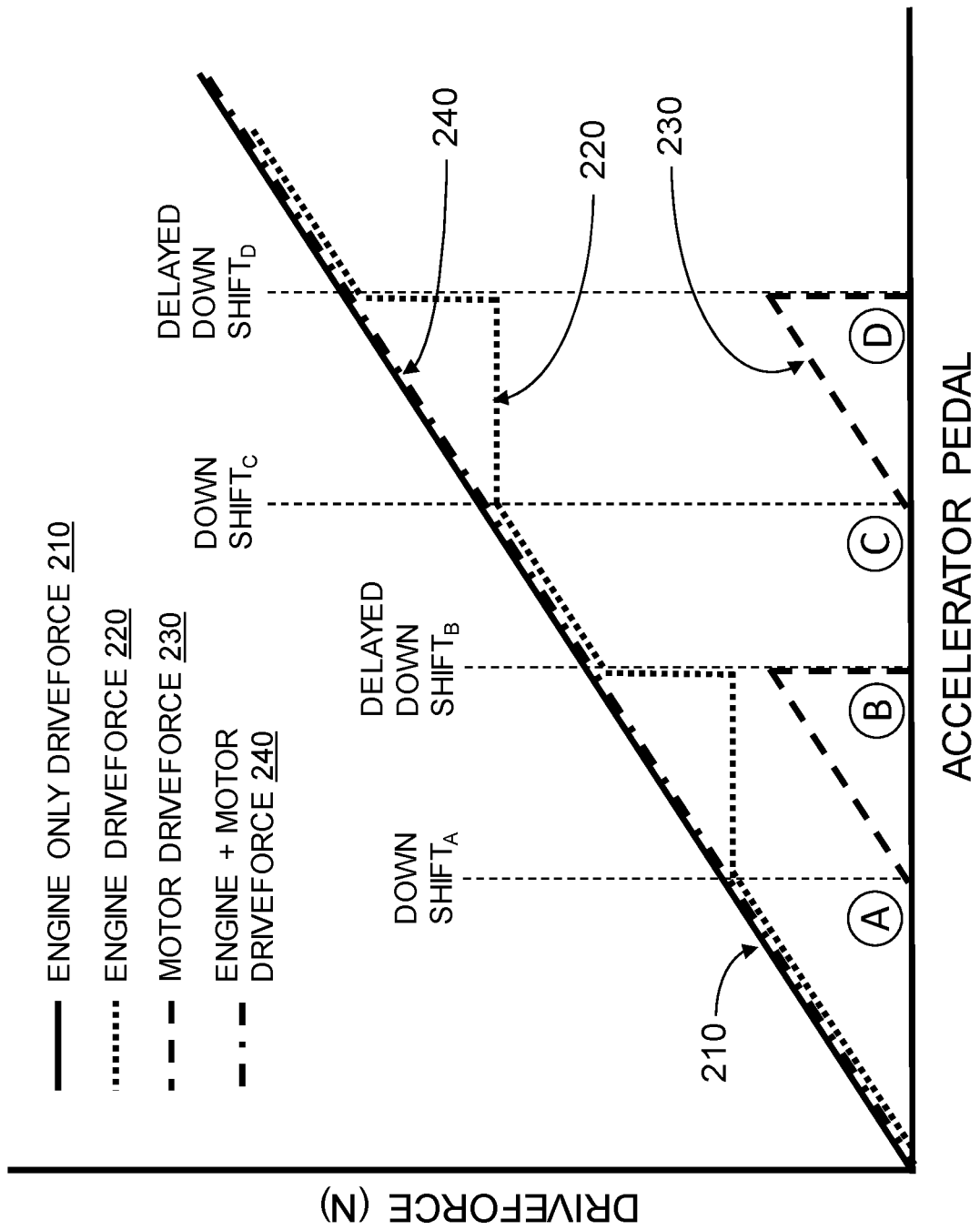
FIG. 2 is an example driveforce map illustrating a plot of driveforce versus accelerator pedal for the hybrid vehicle in accordance with various embodiments of the present disclosure.

FIG. 2 is an example driveforce map illustrating a plot of driveforce versus accelerator pedal for the hybrid vehicle in accordance with various embodiments of the present disclosure. More particularly, driveforce map plots an engine only driveforce 210, an engine driveforce 220 in accordance with the present disclosure, a motor driveforce 230 in accordance with the present disclosure, and a combined driveforce 240 in accordance with the present disclosure. Each of these driveforces are now described.

Engine only driveforce 210 corresponds to a conventional operation of hybrid vehicle. As the accelerator pedal is depressed by the driver, the driveforce 210 required from the engine 14 increases. When accelerator pedal reaches point "A," the engine 14 reaches its maximum driveforce and a downshift of the transmission (illustrated in FIG. 2 as "DOWNSHIFT$_A$") is required to achieve additional driveforce. Similarly, when accelerator pedal reaches point "C," the engine 14 reaches its maximum driveforce in the new gear and a second downshift of the transmission (illustrated in FIG. 2 as "DOWNSHIFT$_C$") is required to achieve additional driveforce.

As alluded to above, downshifting, either in terms of frequency or timing, may have a negative impact on driver experience. In accordance with the present disclosure, driveforce 220 from engine 14 may be augmented with driveforce 230 from motor 12 to result in a combined driveforce 240 in order to delay subsequent downshifts of the transmission. For example, as the accelerator pedal is depressed by the driver, the driveforce 220 required from the engine 14 increases. When accelerator pedal reaches point "A," the engine 14 reaches its maximum driveforce. This time, at point "A," motor 12 begins augmenting engine driveforce 220 with additional motor driveforce 230 resulting in combined driveforce 240. Combined driveforce 240 follows driveforce 210 without requiring the downshift at point "A."

When the accelerator pedal reaches point "B," motor 12 reaches its maximum driveforce. At point "B," with both motor 12 and engine 14 at their respective maximum driveforces, a downshift of the transmission (illustrated in FIG. 2 as "DELAYED DOWNSHIFT$_B$") is required to achieve additional driveforce. As illustrated, augmenting engine 12 with motor 14 delays this downshift from DOWNSHIFT$_A$ to DELAYED DOWNSHIFT$_B$ thereby improving the driver experience.

Between point "B" and point "C", engine 14 is capable of meeting the required driveforce requested by the driver via the accelerator pedal without the aid of motor 12. As a result, between point "B" and point "C," motor 12 does not need to augment engine 14 (i.e., motor 12 does not provide motor torque). When accelerator pedal reaches point "C," the engine 14 again reaches its maximum driveforce and motor 12 begins augmenting engine driveforce 220 with additional motor driveforce 230. Again, combined driveforce 240 follows driveforce 210 without requiring the downshift at point "C" and continues to do so until motor 12 reaches its maximum driveforce at point "D." At point "D," with both motor 12 and engine 14 at their respective maximum driveforces, a second downshift of the transmission (illustrated in FIG. 2 as "DELAYED DOWNSHIFT$_D$") is required to achieve additional driveforce. As illustrated, augmenting engine 12 with motor 14 delays this second downshift from DOWNSHIFT$_C$ to DELAYED DOWNSHIFT$_D$.

Figure 3A:
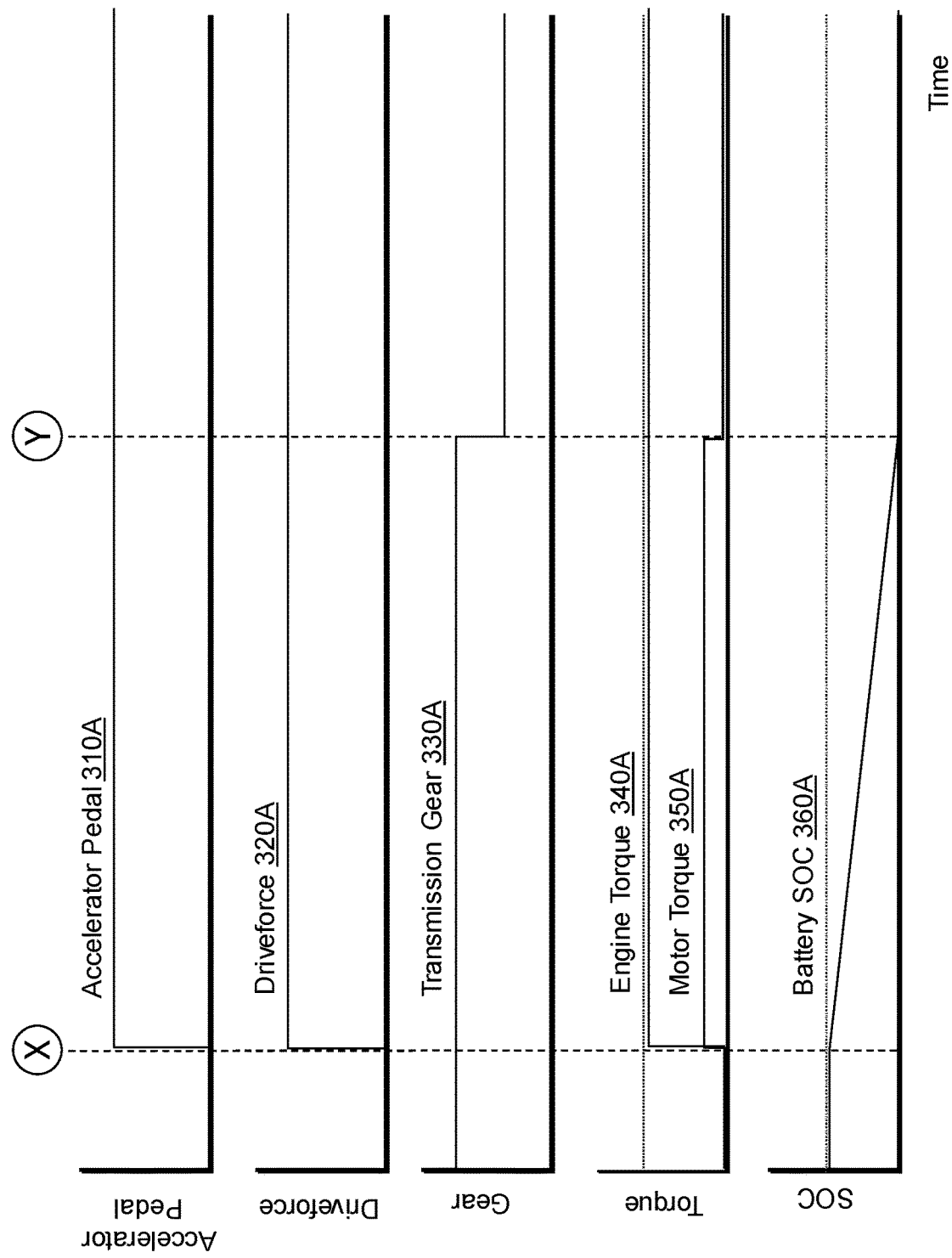
FIG. 3A is an example timing chart illustrating various vehicle parameters of the hybrid vehicle relative to controlling gradeability in accordance with various embodiments of the present disclosure.

FIG. 3A is an example timing chart illustrating various vehicle parameters of the hybrid vehicle relative to controlling gradeability in accordance with various embodiments of the present disclosure. As illustrated, each of an accelerator pedal input 310A, a driveforce 320A, a transmission gear 330A, an engine torque 340A, a motor torque 350A, and a battery state of charge or "SOC" 360A is plotted versus time. At time "X," a driver depresses the accelerator pedal calling for acceleration of the vehicle as indicated by accelerator pedal input 310A. In response to accelerator pedal input 310A, a driveforce 320A required to meet the requirements of accelerator is determined. In this example, driveforce 320A exceeds a maximum driveforce of engine 14. In accordance with this disclosure, rather than downshift the transmission as indicated by transmission gear 330A, engine torque 340A is augmented with motor torque 350A to meet the demand indicated by driveforce 320A as discussed above.

While motor 12 is augmenting engine 14, energy stored by the batteries is decreased as indicated by battery SOC 360A. At time "Y," the battery SOC 360A reaches a minimum SOC (either depletion or some small amount of charge) and motor torque from motor 12 can no longer augment engine torque supplied by engine 14. In order to meet the demand indicated by driveforce 320A at time "Y," a downshift of the transmission is required as indicated by the step down of transmission gear 330A at point "Y."

As mentioned above, in some embodiments, battery SOC is measured, calculated, or sensed to determine whether, or for how long, motor torque from motor 12 may be used to augment engine torque from engine 14. By way of example, motor energy consumed by motor 12 may be determined based on a voltage and a current required to produce the motor torque required from motor 12 to augment the engine torque to meet the demands indicated by the accelerator pedal. Other mechanisms for measuring or sensing battery SOC may also be used. The motor energy consumed may be accumulated (i.e., integrated) over time in order to determine or estimate the remaining energy in batteries 44, or battery SOC. In some embodiments, when battery SOC decreases to a minimum SOC threshold (or alternately, when motor energy consumed increases to a maximum consumption threshold), motor torque from motor 12 may no longer be used to augment engine torque from engine 14 until batteries 44 are recharged. In some embodiments, when battery SOC enters a "low charge" state, motor torque from motor 12 may no longer be used to augment engine torque from engine 14 until batteries 44 are recharged.

In some embodiments, rather than measure, calculate or sense battery SOC, various counters or timers may be used to determine whether, or for how long, motor torque from motor 12 may be used to augment engine torque from engine 14. For example, a motor use timer (not otherwise illustrated) may be used to measure an amount of time motor 12 is used augment engine 14. Once a maximum motor use time is reached, motor 12 may become unavailable to augment engine 14 until batteries 44 are recharged. Similarly, a battery recharge timer or a reset timer (not otherwise illustrated) may be used to measure an amount of time batteries 44 undergo recharging. Once a minimum battery recharge time or minimum reset time is reached, motor 12 may again become available to augment engine 14. In some embodiments, maximum motor use time, minimum battery recharge time and/or reset time may be predetermined and set based, in part, on anticipated use scenarios of vehicle. In some embodiments, maximum motor use time, minimum battery recharge time and/or reset time may be adjusted based on actual use of a particular vehicle.

Figure 3B:
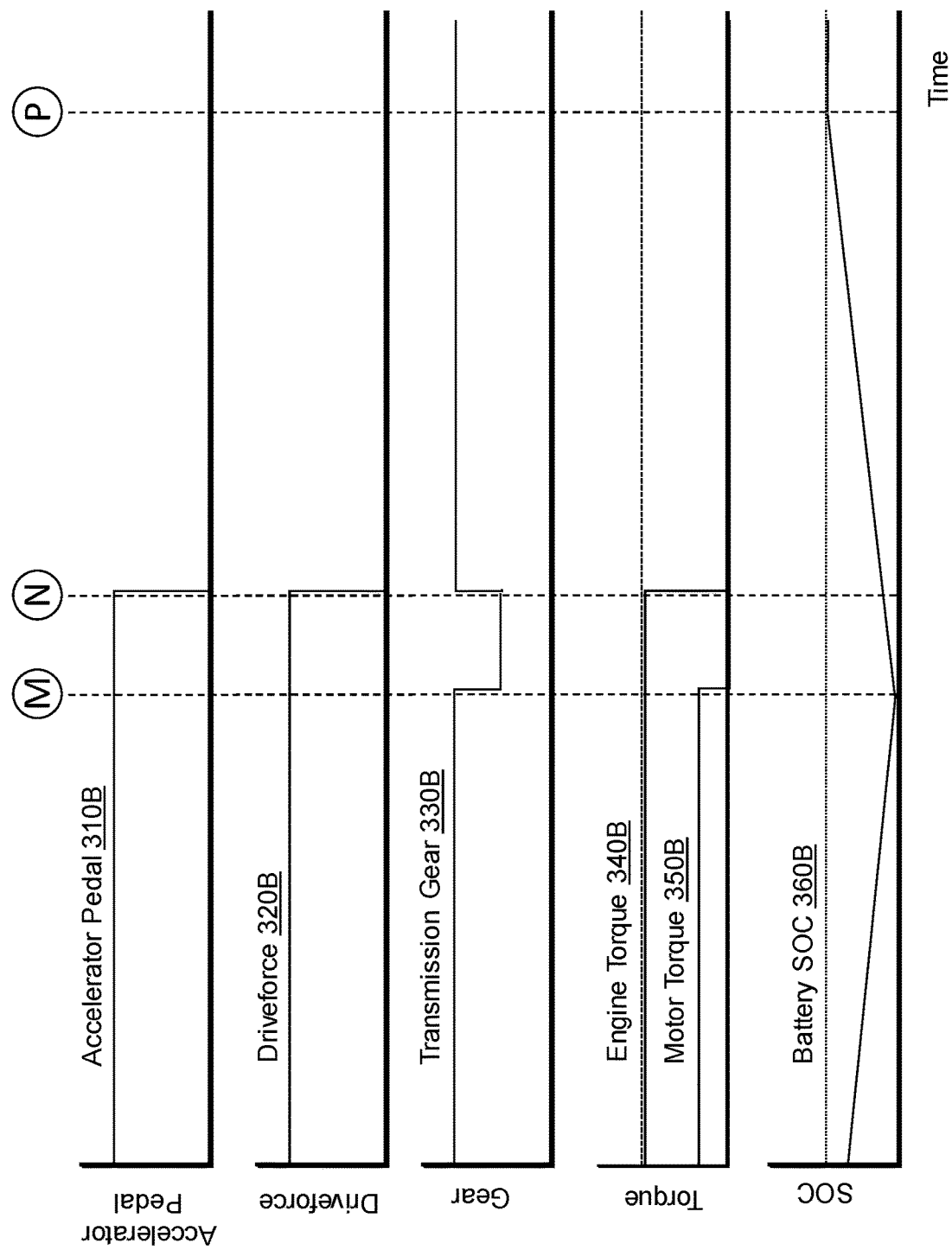
FIG. 3B is an example timing chart illustrating various vehicle parameters of the hybrid vehicle relative to controlling gradeability in accordance with various embodiments of the present disclosure.

FIG. 3B is an example timing chart illustrating various vehicle parameters of the hybrid vehicle relative to controlling gradeability in accordance with various embodiments of the present disclosure. As illustrated, each of an accelerator pedal input 310B, a driveforce 320B, a transmission gear 330B, an engine torque 340B, a motor torque 350B, and a battery SOC 360B is plotted versus time. Prior to time "M," motor 12 augments engine 14 in order to meet the demand of the driveforce 320B as described above. However, at time "M," battery SOC 360B, which is steadily decreasing prior to time "M," reaches the minimum battery SOC. At this time, motor 12 is no longer able to augment engine 14 to meet the demand of driveforce 320B and motor 12 ceases providing further motor torque. In order to continue to meet the demand of driveforce 320B, the transmission is downshifted as indicated by the step down of transmission gear 330B at point "M" thereby allowing engine 14 alone to meet the demand.

During the time between time "M" and time "N," engine 14 alone provides sufficient driveforce to meet the demand of driveforce 320B. At time "N," the call for acceleration ceases as indicated by the drop in accelerator pedal input 310B at time "N," causing a corresponding drop in the driveforce 320B. This reduction in driveforce 320B may permit an upshift in the transmission as indicated by the step up of transmission gear 330B at point "N."

As illustrated in FIG. 3B, motor 12 is not available to augment engine 14 beginning at time "M" and continuing until such time as battery SOC 360B returns to a sufficient state of charge, at for example, time "P." After time "P," battery SOC 360B reaches a sufficient state of charge such that motor 12 may again be available to augment engine 14 with additional driveforce as described above.

Figure 3C:
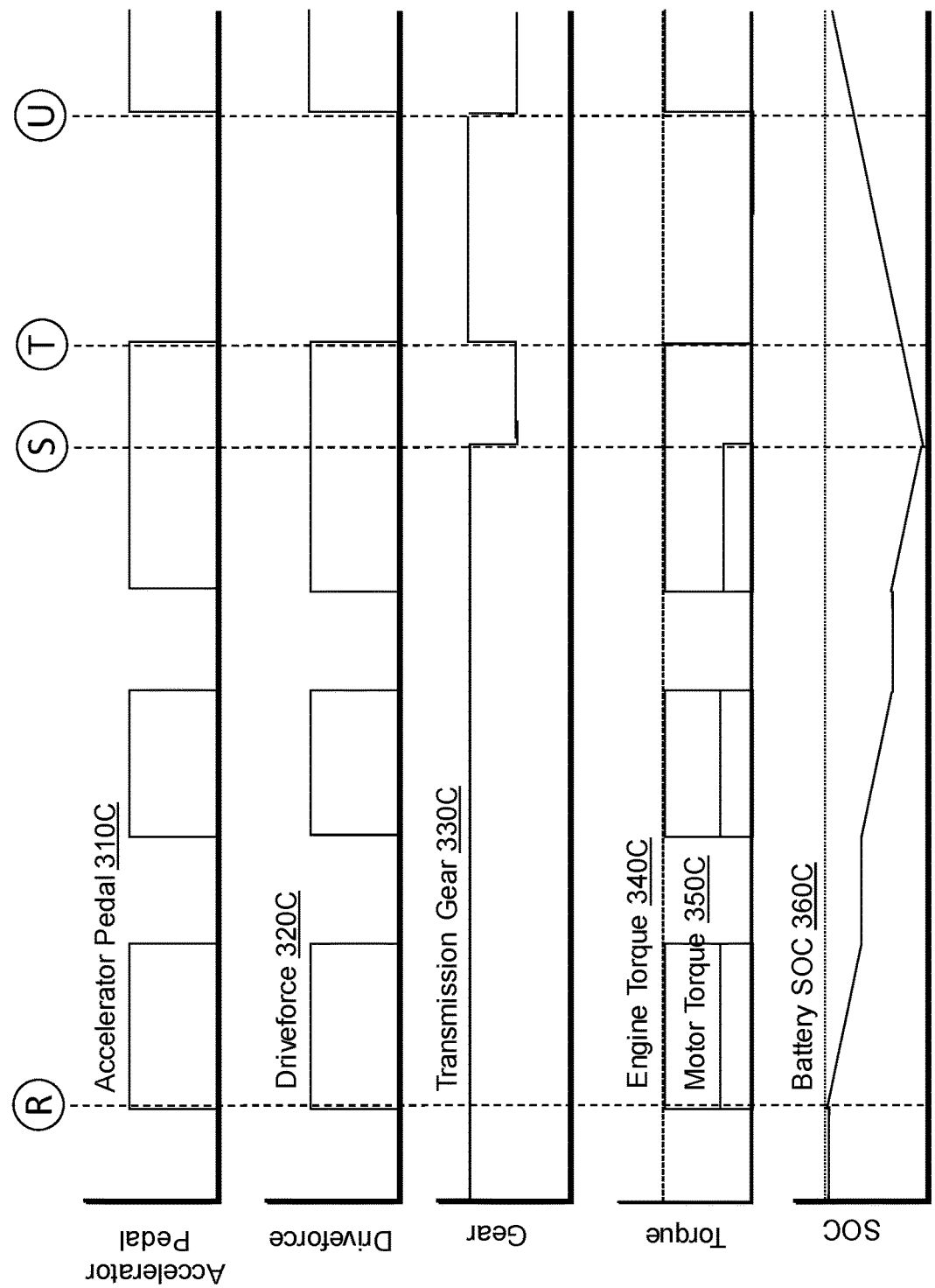
FIG. 3C is an example timing chart illustrating various vehicle parameters of the hybrid vehicle relative to controlling gradeability in accordance with various embodiments of the present disclosure.

FIG. 3C is an example timing chart illustrating various vehicle parameters of the hybrid vehicle relative to controlling gradeability in accordance with various embodiments of the present disclosure. As illustrated, each of an accelerator pedal input 310C, a driveforce 320C, a transmission gear 330C, an engine torque 340C, a motor torque 350C, and a battery SOC 360C is plotted versus time.

Beginning at time "R," accelerator pedal input 310C indicates three brief periods of acceleration resulting in corresponding periods of demand of driveforce 320C. For each period of acceleration, driveforce 320C exceeds the maximum engine driveforce, and motor 12 is used to augment engine 14 as illustrated by engine torque 340C and motor torque 350C in order to meet the demand of driveforce 320C without requiring the transmission to downshift as illustrated by transmission gear 330C. Meanwhile, while motor 12 augments engine 14, battery SOC 360C decreases until such time as battery SOC 360C falls below a minimum battery SOC at time "S." At time "S," motor 12 is no longer able to augment engine 14 to meet the demand of driveforce 320C and motor 12 ceases to provide further motor torque. In order to continue to meet the demand of driveforce 320C, the transmission is downshifted as indicated by the step down of transmission gear 330C at point "S" thereby allowing engine 14 alone to meet the demand from time "S" until time "T" when the call for acceleration ceases, the demand for driveforce decreases and the transmission may be upshifted.

At time "U," acceleration pedal input 310 indicates a new call for acceleration. At this time, in order to meet the corresponding demand of driveforce 320C, the transmission must be immediately downshifted because battery SOC 360C indicates that batteries 44 have not reached a sufficient state of charge for motor 12 to be available to augment engine 14 as described above.

FIG. 4A is a flow chart illustrating an example operation 400-A for controlling gradeability in accordance with various embodiments of the present disclosure. At operation 410, gradeability control component 50E receives a request for acceleration of vehicle 10. In some embodiments, this request may come in the form of an increase in an output of accelerator pedal, indicating that the driver is requesting acceleration of vehicle 10. In some embodiments, the request may come in the form of a command from electronic control unit 50, for example, when operating in cruise control or when operating under autonomous control.

At operation 420, gradeability control component 50E determines whether the target torque required to respond to the request for acceleration exceeds a maximum engine torque of engine 14 in a current transmission gear. If the target torque does not exceed the maximum engine torque, gradeability control component 50E sends control signal(s) to engine control component 50A to increase engine torque (not otherwise illustrated).

If the target torque does exceed the maximum engine torque, then at operation 430, gradeability control component 50E determines whether the state of charge of batteries 44 exceeds a minimum state of charge as described above. If the state of charge of batteries 44 exceeds the minimum state of charge, then at operation 440, gradeability control component 50E sends control signal(s) to motor control component 50C to provide motor torque to augment engine torque in order to meet the target torque in accordance with this disclosure. If the state of charge of batteries 44 does not exceed the minimum state of charge, then at operation 450, gradeability control component 50E sends control signal(s) to gear shift component 50D to downshift the transmission in order to allow engine 14 to meet the target torque without aid from motor 12. As described above, rather than use the state of charge of batteries 44 and the minimum state of charge, gradeability control component 50E may use a motor use timer in conjunction with a maximum motor use time and/or gradeability control component 50E may use a battery recharge timer or a reset timer in conjunction with a minimum battery recharge time or minimum reset time, respectively, in order to determine whether motor 12 may be used to augment engine 14.

Figure 4B:
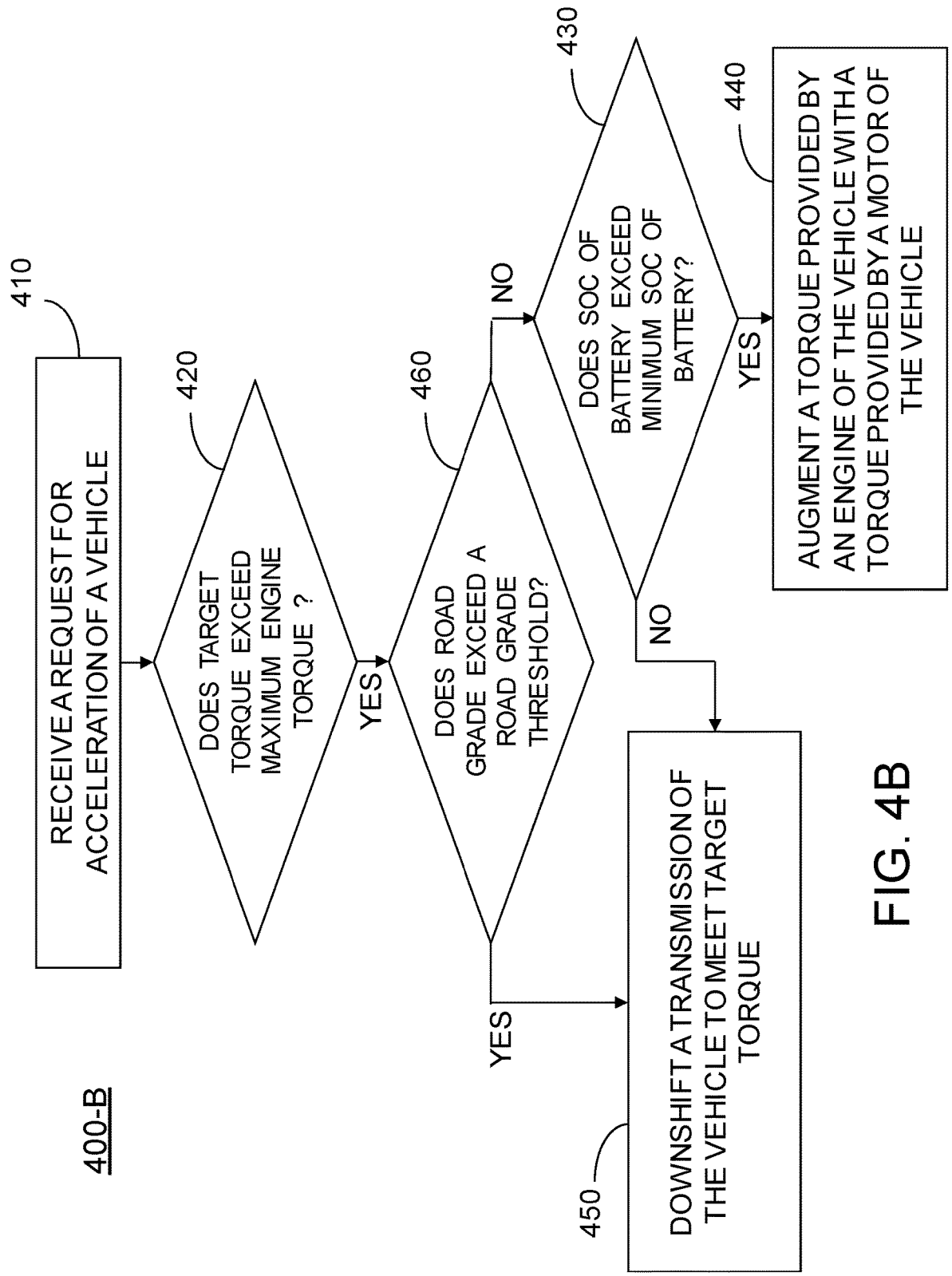
FIG. 4B is a flow chart illustrating an example operation for controlling gradeability in accordance with various embodiments of the present disclosure.

FIG. 4B is a flow chart illustrating an example operation 400-B for controlling gradeability in accordance with various embodiments of the present disclosure. At operation 410, gradeability control component 50E receives a request for acceleration of vehicle 10. Again, in some embodiments, this request may come in the form of an increase in the output of accelerator pedal or in the form of the command from electronic control unit as described above.

At operation 420, gradeability control component 50E determines whether the target torque required to respond to the request for acceleration exceeds a maximum engine torque of engine 14 in a current transmission gear. If the target torque does not exceed the maximum engine torque, gradeability control component 50E sends control signal(s) to engine control component 50A to increase engine torque (not otherwise illustrated).

If the target torque does exceed the maximum engine torque, then at operation 460, gradeability control component 50E requests an indication of a current road grade from road condition/location component 50G and then determines whether the road grade exceeds a maximum road grade threshold. While "road grade" is used herein for purposes of this disclosure, any factor that causes an effective temporary increase in load on engine 14 in order for engine 14 to maintain a speed of the vehicle 10 may be considered, including, for example, wind resistance, air conditioning load, increased vehicle mass, etc. The purpose in the embodiments of FIG. 4B is for gradeability control component 50E to attempt to distinguish between short term requests for acceleration for purposes of increasing vehicle speed versus typically longer term requests for acceleration for purposes of maintaining vehicle speed. If the road grade does exceed the maximum road grade threshold, then at operation 450, gradeability control component 50E sends control signal(s) to gear shift component 50D to downshift the transmission in order to allow engine 14 to meet the target torque without aid from motor 12.

If the road grade does not exceed the maximum road grade threshold, then at operation 430, gradeability control component 50E determines whether the state of charge of batteries 44 exceeds a minimum state of charge as described above. If the state of charge of batteries 44 exceeds the minimum state of charge, then at operation 440, gradeability control component 50E sends control signal(s) to motor control component 50C to provide motor torque to augment engine torque in order to meet the target torque in accordance with this disclosure. If the state of charge of batteries 44 does not exceed the minimum state of charge, then at operation 450, gradeability control component 50E sends control signal(s) to gear shift component 50D to downshift the transmission in order to allow engine 14 to meet the target torque without aid from motor 12. Again, as described above, gradeability control component 50E may use various timers rather than the state of charge of batteries 44 to determine whether motor 12 may be used to augment engine 14.

Figure 5:
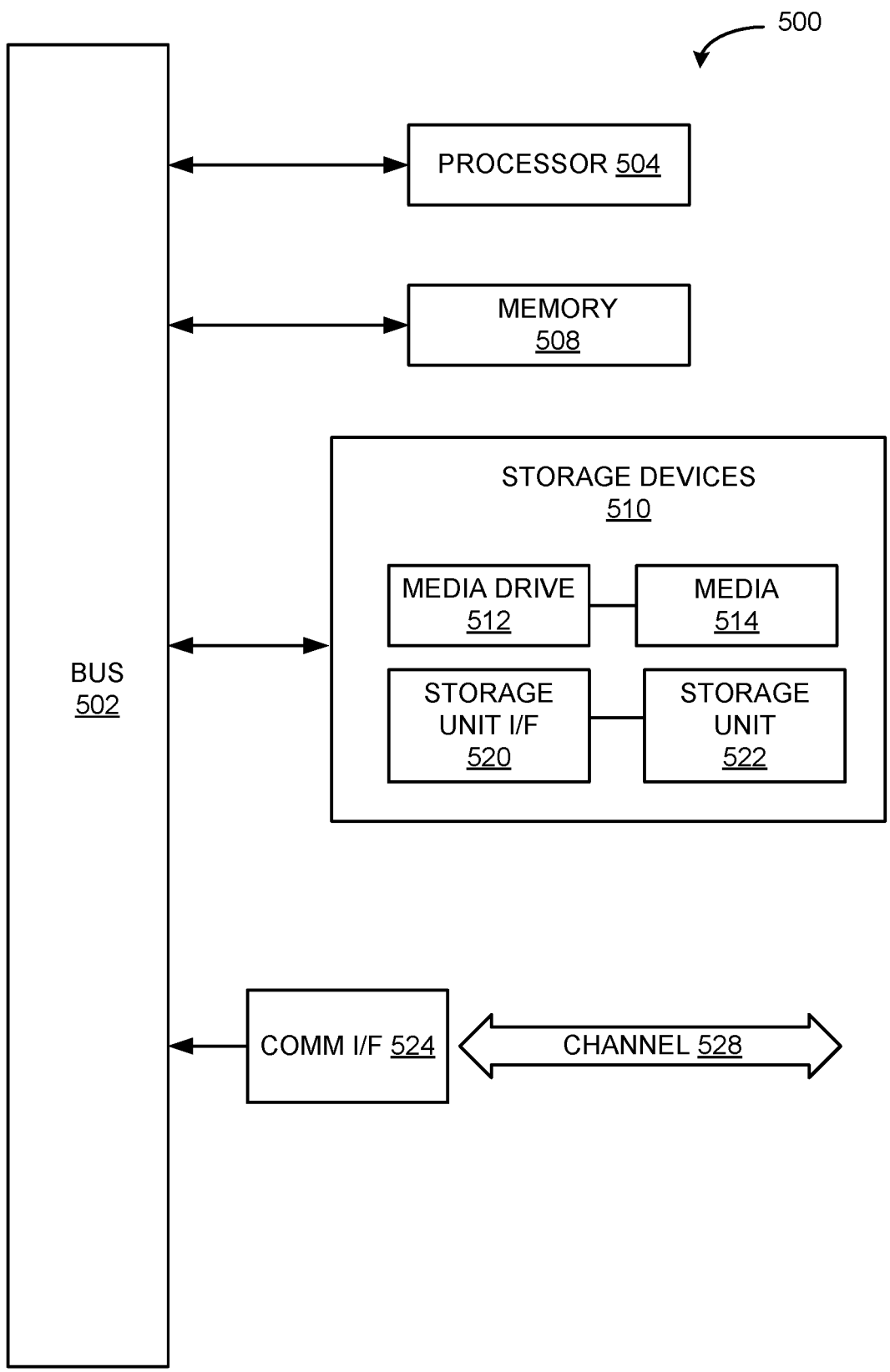
FIG. 5 is an example computing component that may be used to implement various features of embodiments described in the present disclosure.

As used herein, the term component may describe a given unit of functionality that may be performed in accordance with one or more embodiments of the present application. As used herein, a component may be implemented utilizing any form of hardware, software, or a combination thereof. For example, one or more processors, controllers, ASICs, PLAs, PALs, CPLDs, FPGAs, logical components, software routines or other mechanisms may be implemented to make up a component. Various components described herein may be implemented as discrete components or described functions and features may be shared in part or in total among one or more components. In other words, as would be apparent to one of ordinary skill in the art after reading this description, the various features and functionality described herein may be implemented in any given application. They may be implemented in one or more separate or shared components in various combinations and permutations. Although various features or functional elements may be individually described or claimed as separate components, it should be understood that these features/functionality may be shared among one or more common software and hardware elements. Such a description shall not require or imply that separate hardware or software components are used to implement such features or functionality.

Where components are implemented in whole or in part using software, these software elements may be implemented to operate with a computing or processing component capable of carrying out the functionality described with respect thereto. One such example computing component is illustrated in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within computer processing units or any other type of special-purpose or general-purpose computing devices as may be desirable or appropriate for a given application or environment. Computing component 500 may also represent computing capabilities embedded within or otherwise available to a given device. For example, a computing component may be found in other electronic devices such as, for example, electronic devices that may include some form of processing capability.

Computing component 500 may include, for example, one or more processors, controllers, control components, or other processing devices. This may include a processor, and/or any one or more of the components making up electronic control device 50 and/or its component parts, or other components or elements of vehicle, e.g., signal sensors, etc. Processor 504 may be implemented using a general-purpose or special-purpose processing engine such as, for example, a microprocessor, controller, or other control logic. Processor 504 may be connected to a bus 502. However, any communication medium may be used to facilitate interaction with other components of computing component 500 or to communicate externally.

Computing component 500 may also include one or more memory components, simply referred to herein as main memory 508. For example, random access memory (RAM) or other dynamic memory, may be used for storing information and instructions to be executed by processor 504. Main memory 508 may also be used for storing temporary variables or other intermediate information during execution of instructions to be executed by processor 504. Computing component 500 may likewise include a read only memory ("ROM") or other static device coupled to bus 502 for storing static information and instructions for processor 504.

The computing component 500 may also include one or more various forms of information storage mechanism 510, which may include, for example, a media drive 512 and a storage unit interface 520. The media drive 512 may include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive may be provided. Storage media 514 may include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 may include a computer usable storage medium having stored therein computer software or data.

In alternative embodiments, information storage mechanism 510 may include other similar instrumentalities for allowing computer programs or other instructions or data to be loaded into computing component 500. Such instrumentalities may include, for example, a fixed or removable storage unit 522 and an interface 520. Examples of such storage units 522 and interfaces 520 may include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 may also include a communications interface 524. Communications interface 524 may be used to allow software and data to be transferred between computing component 500 and external devices. Examples of communications interface 524 may include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which may be electronic, electromagnetic (which includes optical) or other signals capable of being exchanged by a given communications interface 524. These signals may be provided to communications interface 524 via a channel 528. Channel 528 may carry signals and may be implemented using a wired or wireless communication medium. Some examples of a channel may include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 500 to perform features or functions of the present application as discussed herein.

It should be understood that the various features, aspects and functionality described in one or more of the individual embodiments are not limited in their applicability to the particular embodiment with which they are described. Instead, they may be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, may be combined in a single package or separately maintained and may further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A method performed by a gradeability control component of a vehicle comprising:
   receiving a request for acceleration of the vehicle;
   determining whether the request for acceleration requires a target torque generated from an engine of the vehicle to exceed a maximum engine torque of the engine;
   when the target torque exceeds the maximum engine torque:
      determining whether a motor of the vehicle is available to augment the torque generated by the engine with a torque generated by the motor,
      when the motor of the vehicle is available to augment the torque generated by the engine, augmenting the torque generated by the engine of the vehicle with the torque generated by the motor of the vehicle to meet the target torque, and
      when the motor of the vehicle is unavailable to augment the torque generated by the engine, downshifting a transmission of the vehicle to meet the target torque.

2. The method of claim 1, wherein determining whether a motor of the vehicle is available to augment the torque generated by the engine with a torque generated by the motor comprises determining whether a state of charge of a battery providing current to the motor of the vehicle exceeds a minimum state of charge for the battery.

3. The method of claim 2, wherein determining a state of charge of a battery providing current to a motor of the vehicle comprises determining an amount of current being provided by the battery to the motor.

4. The method of claim 2, wherein determining a state of charge of a battery providing current to a motor of the vehicle comprises integrating, over time, an amount of current being provided by the battery to the motor.

5. The method of claim 1, wherein determining whether a motor of the vehicle is available to augment the torque generated by the engine with a torque generated by the motor comprises determining whether a motor use timer exceeds a maximum motor use time.

6. The method of claim 1, wherein determining whether a motor of the vehicle is available to augment the torque generated by the engine with a torque generated by the motor comprises determining whether a battery recharge timer exceeds a minimum battery recharge time.

7. The method of claim 1, further comprising:
determining whether the request for acceleration is due to an increase in road grade; and
when the request for acceleration is due to the increase in road grade, downshifting the transmission of the vehicle to meet the target torque.

8. The method of claim 7, wherein determining whether the request for acceleration is due to an increase in road grade comprises determining whether the road grade is less than a road grade threshold.

9. The method of claim 8, further comprising:
when the motor of the vehicle is available to augment the torque generated by the engine, delaying a downshift of the transmission of the vehicle thereby improving a driver experience.

10. A hybrid electric vehicle, comprising:
an internal combustion engine;
an electric motor operatively connected in parallel to the internal combustion engine; and
an electronic control unit configured to control operation of the electric motor to augment engine torque generated by the internal combustion engine with motor torque generated by the electric motor, wherein the electronic control unit is configured to:
receive a request for acceleration of the hybrid electric vehicle;
determine whether the request for acceleration requires a target torque generated from the internal combustion engine of the vehicle to exceed a maximum engine torque of the internal combustion engine;
when the target torque exceeds the maximum engine torque:
determining whether the electric motor of the hybrid electric vehicle is available to augment the torque generated by the internal combustion engine with a torque generated by the electric motor,
when the electric motor of the hybrid electric vehicle is available to augment the torque generated by the internal combustion engine, augmenting the torque generated by the internal combustion engine of the hybrid electric vehicle with the torque generated by the electric motor of the hybrid electric vehicle to meet the target torque, and
when the electric motor of the hybrid electric vehicle is unavailable to augment the torque generated by the internal combustion engine, downshifting a transmission of the hybrid electric vehicle to meet the target torque.

11. The hybrid electric vehicle of claim 10, wherein the electronic control unit configured to determine whether the electric motor of the hybrid electric vehicle is available to augment the torque generated by the internal combustion engine with a torque generated by the electric motor is further configured to determine whether a state of charge of a battery providing current to the electric motor of the hybrid electric vehicle exceeds a minimum state of charge for the battery.

12. The hybrid electric vehicle of claim 11, wherein the electronic control unit configured to determine a state of charge of a battery providing current to the electric motor of the hybrid electric vehicle is further configured to determine an amount of current being provided by the battery to the electric motor.

13. The hybrid electric vehicle of claim 11, wherein the electronic control unit configured to determine a state of charge of a battery providing current to the electric motor of the hybrid electric vehicle is further configured to integrate, over time, an amount of current being provided by the battery to the electric motor.

14. The hybrid electric vehicle of claim 10, wherein the electronic control unit configured to determine whether the electric motor of the hybrid electric vehicle is available to augment the torque generated by the internal combustion engine with a torque generated by the electric motor is further configured to determine whether a motor use timer exceeds a maximum motor use time.

15. The hybrid electric vehicle of claim 10, wherein the electronic control unit configured to determine whether the electric motor of the hybrid electric vehicle is available to augment the torque generated by the internal combustion engine with a torque generated by the electric motor is further configured to determine whether a battery recharge timer exceeds a minimum battery recharge time.

16. The hybrid electric vehicle of claim 10, wherein the electronic control unit is further configured to:
determining whether the request for acceleration is due to an increase in road grade; and
when the request for acceleration is due to the increase in road grade, downshifting the transmission of the hybrid electric vehicle to meet the target torque.

17. The hybrid electric vehicle of claim 16, wherein determining whether the request for acceleration is due to an increase in road grade comprises determining whether the road grade is less than a road grade threshold.

18. The hybrid electric vehicle of claim 17, further comprising:
when the electric vehicle motor of the hybrid electric vehicle is available to augment the torque generated by the internal combustion engine, delaying a downshift of the transmission of the hybrid electric vehicle thereby improving a driver experience.

* * * * *